(12) United States Patent
Losonczi (10) Patent No.: US 8,091,303 B2
(45) Date of Patent: Jan. 10, 2012

(54) TRANSLUCENT BUILDING BLOCK AND A METHOD FOR MANUFACTURING THE SAME

(76) Inventor: Aron Losonczi, Csongrad (HU)

( * ) Notice: Subject to any disclaimer, the term of this patent is extended or adjusted under 35 U.S.C. 154(b) by 0 days.

(21) Appl. No.: 12/452,591

(22) PCT Filed: Jul. 10, 2008

(86) PCT No.: PCT/HU2008/000084
§ 371 (c)(1),
(2), (4) Date: Mar. 4, 2010

(87) PCT Pub. No.: WO2009/007765
PCT Pub. Date: Jan. 15, 2009

(65) Prior Publication Data
US 2010/0281802 A1    Nov. 11, 2010

(30) Foreign Application Priority Data
Jul. 11, 2007   (HU) ..................... 0700475

(51) Int. Cl.
*E04B 5/46*  (2006.01)
*E04C 1/42*  (2006.01)
*E04C 1/00*  (2006.01)

(52) U.S. Cl. ........ 52/307; 52/306; 52/309.1; 52/309.13; 52/309.14; 52/503

(58) Field of Classification Search .................... 52/307, 52/306, 309.1, 309.13, 309.14, 503, 309.15, 52/309.16, 596, 404.1, 600, 592.6, 592.5, 52/405.1, 604, 606, 608, 309.11, 426, 454, 52/677, 712, 707, 713, 714; 264/261
See application file for complete search history.

(56) References Cited

U.S. PATENT DOCUMENTS

| | | | | | |
|---|---|---|---|---|---|
| 1,964,816 | A | * | 7/1934 | Graydon | 52/600 |
| 2,669,114 | A | * | 2/1954 | Mills | 52/454 |
| 2,951,001 | A | * | 8/1960 | Rubenstein | 428/142 |
| 3,091,899 | A |  | 6/1963 | Bordlein | |
| 3,857,217 | A | * | 12/1974 | Reps | 52/592.1 |
| 3,904,866 | A | * | 9/1975 | Hayes | 362/615 |
| 4,263,765 | A | * | 4/1981 | Maloney | 52/562 |
| 4,427,818 | A | * | 1/1984 | Prusinski | 524/442 |
| 4,570,207 | A | * | 2/1986 | Takahashi et al. | 362/153.1 |
| 5,214,897 | A | * | 6/1993 | Nordberg | 52/585.1 |
| 5,596,855 | A | * | 1/1997 | Batch | 52/309.11 |
| 5,611,183 | A | * | 3/1997 | Kim | 52/426 |
| 5,683,170 | A | * | 11/1997 | Blaha | 362/145 |
| 5,688,428 | A | * | 11/1997 | Maguire | 249/91 |

(Continued)

FOREIGN PATENT DOCUMENTS

GB    794864    5/1958

(Continued)

*Primary Examiner* — Eileen D Lillis
*Assistant Examiner* — Mark Wendell
(74) *Attorney, Agent, or Firm* — Dowell & Dowell, PC (57) ABSTRACT

A translucent building block and method of manufacturing the same where the block has at least two oppositely oriented outer surfaces between which extend a plurality of translucent members that are mounted to a retainer which supports the translucent members spaced inwardly of opposite free ends thereof which extend outwardly from the retainer to points adjacent the at least two outer surfaces and wherein a plurality of openings are provided through the retainer to permit passage of cast material during introduction of the material about the translucent members within a mold during a manufacturing process.

10 Claims, 7 Drawing Sheets

U.S. PATENT DOCUMENTS

| | | | |
|---|---|---|---|
| 5,836,130 A * | 11/1998 | Unruh et al. | 52/698 |
| 5,992,119 A * | 11/1999 | Rokhlin | 52/596 |
| 6,082,886 A * | 7/2000 | Stanford | 362/576 |
| 6,088,987 A * | 7/2000 | Simmons et al. | 52/592.6 |
| 6,231,025 B1 * | 5/2001 | Takemura | 249/40 |
| 6,398,399 B1 * | 6/2002 | Neophytou | 362/576 |
| 6,536,172 B1 * | 3/2003 | Amend | 52/426 |
| 7,229,203 B2 * | 6/2007 | Lath | 362/576 |
| 7,316,519 B2 * | 1/2008 | Ryman et al. | 404/22 |
| 7,547,128 B2 * | 6/2009 | Lath | 362/576 |
| 2001/0029717 A1 * | 10/2001 | Spakousky | 52/405.4 |
| 2002/0108338 A1 * | 8/2002 | Barnett et al. | 52/309.16 |
| 2005/0183372 A1 * | 8/2005 | Losonczi | 52/596 |
| 2006/0059819 A1 * | 3/2006 | La Vorgna | 52/405.1 |
| 2007/0074484 A1 | 4/2007 | Yin | |
| 2008/0104911 A1 * | 5/2008 | Jarvie et al. | 52/309.1 |
| 2008/0209843 A1 * | 9/2008 | Helms | 52/677 |
| 2009/0235601 A1 * | 9/2009 | Mellett | 52/426 |
| 2010/0050551 A1 * | 3/2010 | Boeshart | 52/426 |
| 2010/0107541 A1 * | 5/2010 | Bohnhoff | 52/561 |

FOREIGN PATENT DOCUMENTS

| | | |
|---|---|---|
| JP | 1219251 | 9/1989 |
| JP | 2006224349 | 8/2006 |
| WO | 03/097954 | 11/2003 |
| WO | 2006/070214 | 7/2006 |

* cited by examiner

TRANSLUCENT BUILDING BLOCK AND A METHOD FOR MANUFACTURING THE SAME

BACKGROUND OF THE INVENTION

1. Field of the Invention

This invention relates to a building block with translucent properties allowing light transmission between spaced first and second boundary surfaces. The translucent properties are provided by discrete translucent members extending between the boundary surfaces and which are spaced form one another. The building block is formed by a cast material filling spaces between the translucent members. The translucent members have sufficient rigidity to remain in position within the building block under the effect of forces applied by the casting of the cast material. The translucent members are interconnected by retainer elements to constitute an integral mechanical structure. The invention is also directed to a method for producing a translucent building block incorporating the integral mechanical structure.

2. Brief Description of the Related Art

The natural inner illumination of buildings is provided by windows created in walls, ceilings or roof structures and containing translucent or transparent materials having weatherproof properties. It is also common to apply transparent, translucent, colored, dyed or water-clear windows of different sizes or aesthetic illumination purposes. Other types of transparent members are also built in between load bearing members like bricks. The number and the sizes of the transparent members are limited by economical, static, heat insulating and mechanical requirements relating to a structure.

The patent document GB 794,864 discloses a translucent building member, where the prefabricated building members, consisting of a translucent member and a framework, are disposed between load bearing building elements. The framework makes the building strength of the member independent from the mechanical strength of the translucent member. However, its disadvantage is that it requires correct fitting of discrete elements at predetermined locations during building of a wall structure.

Embedding of translucent elements into in situ or prefabricated building elements is disclosed in patent document U.S. Pat. No. 3,091,899, where glass strips are embedded randomly in a binding material such that the glass strips guide light between two sides of a building element. The strips project from at least one surface of the building element. Such projecting strips encumber the bricklaying job and the load bearing property of a wall consisting of such elements is limited to a great extent because of the risk of slipping at contact areas between the glass and binding material.

Improved handling and strength properties can be obtained by applying glass fibers arranged in a binding matrix such as concrete. The patent document JP 2006224349 discloses a method comprising the steps of arranging a glass fiber fabric into a mold cavity, filling the mold cavity with concrete to a level of the fabric, and then repeating the procedure until the cavity is filled. Disadvantages of this method are that it is very labor intensive and the application of glass fibers involves extremely high costs.

Publication WO 03/097954 discloses a building block having translucent elements embedded in a structural building material cast in between the two surfaces of a building element, and both ends of the glass fibers are evenly distributed along the two surfaces. From the document US 2007/0074484 A1 a translucent concrete element is known, where glass fibers are spanned between two sheets of an auxiliary framework with spaces between the fibers being filed with a setting material. Thereafter, the sheets of the auxiliary framework are removed and a translucent building block is obtained. Shortcoming of both solutions relates to the costs incurred by the application of glass fibers.

WO 03/097954 discloses a building block and a method of its production, wherein glass fibers are continuously introduced into a longitudinal mold while filling the mold with a binding material matrix and settling the material by vibration and/or pressure. The solidified element is cut across its cross section into elements and thereafter machining the surfaces thus obtained. An advantage of this solution is the continuous production, but applying glass fibers is a shortcoming also in this case.

A further common disadvantage of the above methods is that the translucent members are positioned randomly or the grouping of members is labor intensive or impossible.

The above shortcomings are intended to be resolved by the method disclosed in document JP 1219251, where openings are formed in a flexible or rigid retainer sheet, translucent members, i.e. glass prisms are placed in the openings, and then covering the sheet by a concrete layer having a height according to the height of the prisms. After setting of the concrete layer the flexible sheet is removed and at least one of the surfaces of the member is machined. In the case of a rigid retainer sheet, it remains on the surface. Disadvantages of this method are that the adequate forming of the retainer sheet having no role in the light guidance and requires further work and costs, and when the sheet remains on the building member, it complicates completion of the member and removing it forms wastes. Moreover, in the production of thicker building blocks or when applying slimmer and/or less rigid translucent members, there is no method for fixing the relative position of the translucent members neither to each other nor to the mold, as the retainer sheet is positioned as far as possible from either of the surfaces of the building member, furthermore, the method is inadequate for vertical production of building blocks in the absence of adequate fixing of the translucent members in place during production.

The patent document WO 2006/070214 discloses a light transmitting object and a method for manufacturing the same. The object comprises a substantially non-transparent solid material having rigid (non-flexible) inserts embedded in it, and the inserts can be transparent elements. The surface of the light-transmitting object is partly formed by a part of the surface of the transparent elements. The inserts are fastened to each other either by using adhesive binding material or by the interposition of intermediate spacer members, the whole forming together a skeleton which is embedded in a cast material. The inserts forming the skeleton are fastened to each other by means of bonding. However, a disadvantage of In this solution is that prefabricating of the skeleton by bonding the different inserts requires an intensive and time consuming handwork and indirect materials like gluing agents as well. The shape, size and orientation of the translucent elements can largely differ. In certain embodiments the translucent elements can be plates extending between opposite sides of the building block and dividing it spaced parts, so that the cast material cannot penetrate through the plate and will not constitute a uniform cast body. The lack of a uniform cast body has a negative effect on the mechanical strength, stability and rigidity of the whole block. In further embodiments the elements define very small spacings between them or complex shapes, and the cast material cannot fill such spaces and thus cannot provide the required strength. Due to the way the transparent elements are arranged, it is practically impossible to achieve an accuracy needed to position this skeleton in a mold for producing a light-transmitting object. Furthermore, there is no adequate teaching about how a skeleton is to be fixed in positioned during pouring of a casting material in the mold. Consequently, this method is difficult to us on an industrial scale.

SUMMARY OF THE INVENTION

Therefore, an object of this invention is to provide a translucent building block, which overcomes the shortcomings of the prior art, namely, it can be produced easily at a low cost and in arbitrary sizes, there is no need to apply expensive additional materials, and provides a solution for fixing the relative position of the translucent members either to each other or to the mold. Another object of the present invention is to be able to arrange translucent or transparent configurations, signs, figures and works of art in solid walls, which are illuminated by either natural or artificial light.

To achieve the object of the present invention a translucent building block is provided, having at least two, a first and a second opposing outer surfaces, between which there extends a translucent member with cast material surrounding the member. The translucent member is connected so as to extend transversely from a substantially flat retainer structure to thereby form an insert for a mold and wherein the retainer structure has a plurality of openings there through through which casting material flows when being introduced into the mold. The translucent member is relatively rigid has a first in contact with the first outer surface and a second end in contact with the second outer surface. Each translucent member is continuous for guiding of light through the building block or object.

According to the invention, the translucent elements are arranged in at least one discrete group (forming an insert member for the building block), and are formed by rods having solid cross sectional profiles and the at least one retainer structure extends transversely relative to the translucent elements and is connected to all of the translucent elements in at least one group. A first section of each of the translucent elements extends out from one side of the retainer structure to the first boundary or outer surface and a second section of each of the translucent elements extends out from the other side of the retainer structure to the second boundary or outer surface. The retainer structure also having openings between said translucent elements for providing space for the cast material to flow to interconnect the sections of the building block on opposite sides of the retainer structure.

Preferably at least one at least one fixing or anchoring member is secured to the retainer structure and the translucent member may also be provided with a fixing or anchoring member.

The translucent member is a prism that can be made of glass or plastic, i.e. PMMA/poly(metyl-metacrilate)/, PC/polycarbonate/, or COC/cycloolefine copolymer/. The retainer structure may be made of heat insulating material or its surface covered by heat insulating material. Elements of a linear or bar-mat reinforcement are arranged along the retainer structure, beside and/or between the translucent members. Additional reinforcement pieces can be arranged in the openings formed in the retainer structure.

Further, the translucent building block of the invention also discloses an insert member for forming a translucent building block, wherein the insert member consists of at least one relatively flat retainer structure and at least one relatively rigid translucent member attached thereto, and the translucent member has at least one section projecting from transversely relative to the retainer structure, and sections of each translucent member are continuous in regard to guiding of light.

The retainer structure and translucent members may be made of the same material, or the retainer structure and translucent member can be made of different materials.

The translucent members may be mounted on the retainer structure, or the translucent members can be formed integrally with the retainer structure.

Moreover, the invention discloses a method as well for manufacturing a translucent building block including the steps of arranging a translucent member in mold cavity delimited by at least a base surface and side walls, filling the mold cavity with casting material, letting the casting material set, then removing the building block from the mold cavity. The translucent member is connected to at least one retainer structure and has opposite ends extending from the at least one retainer structure to points of contact with the base surface or side walls of the mold cavity.

Therefore, the method for manufacturing the building block according to the invention includes the steps of arranging and positioning the integral mechanical structure in a mold cavity having at least opposing side walls and a bottom, so that the translucent members extend across and contact the side walls and then filling the mold cavity with a fluid casting material, and following the setting of the material, separating the building block from the mold cavity. During the arranging and positioning step pressing slightly all of said a slight pressure is applied to the ends of the translucent members by constraining or applying a force to the side walls and by placing a resilient sheet between the translucent members and at least one of the side walls, wherein the resilient sheet distributes pressure evenly among the translucent members. The resilient sheets are applied preferably at the interior of both of the opposing side walls.

The insert member(s) can be arranged in the mold cavity so as to be supported by the base surface, or such that the ends of the translucent members are seated in holes formed in the base surface.

It is also possible to fix the insert member including the translucent members and the at least one retainer structure to the base surface and/or to the side walls by means of a clamping strap and/or wire-like ties, and/or by applying a force by means of reinforcement elements, or by arranging the insert member in the mold cavity so as to support the insert member by another insert member, or by supporting the insert member by the side walls so as to fix the insert member by constraining it between opposite side walls of a form defining the mold cavity.

The insert member(s) may also be supported by inserting ends of the translucent members into holes formed in the side walls of the mold and the mold cavity can be provided with a liner made of a material having adequate elasticity or being able to become deformed locally if exposed to pressure.

The form may be clamped by means of bars passed through at least one opening and a hole formed in the side walls and fixed on the outer surface of the opposite side walls of the mold, and relieving the translucent members by means of a spacer bar, i.e. a pipe having at least the same length as the total length of the translucent members, and arranged parallel to and around the bars, and optionally covering the surface of the retainer structure with heat insulating material.

Elements of a linear or bar-mat reinforcement can be arranged along the retainer structure, beside and/or between the translucent members and also a reinforcement piece may be positioned in the openings formed on the retainer structure.

In a preferred embodiment, at least one of the outer surfaces of the building block may be machined, after removing the building block from the mold cavity.

The invention further discloses a form for manufacturing a translucent building block, having at least two side walls defining opposite walls of a mold cavity, and clamping means for placing pressure on the side walls.

The clamping means may consist of a bar passed through at least one hole formed in the sidewall and in a liner, and of a spacer member arranged in the cavity and abutted against the surface of the liner facing the cavity.

The spacer member may include a translucent member. In a preferred embodiment the spacer member can also consist of a bar, i.e. a pipe, having at least the same length as the length of the translucent members, and arranged parallel to and around the bars, where the difference between the total length of the spacer bar and that of the translucent members is between zero and twice of a thickness of the liner, and preferably less than the thickness of the liner.

BRIEF DESCRIPTION OF THE DRAWINGS

The invention will be disclosed in detail by describing the preferred embodiments referring to the attached drawings wherein.

DESCRIPTION OF THE PREFERRED EMBODIMENTS

Figure 1:
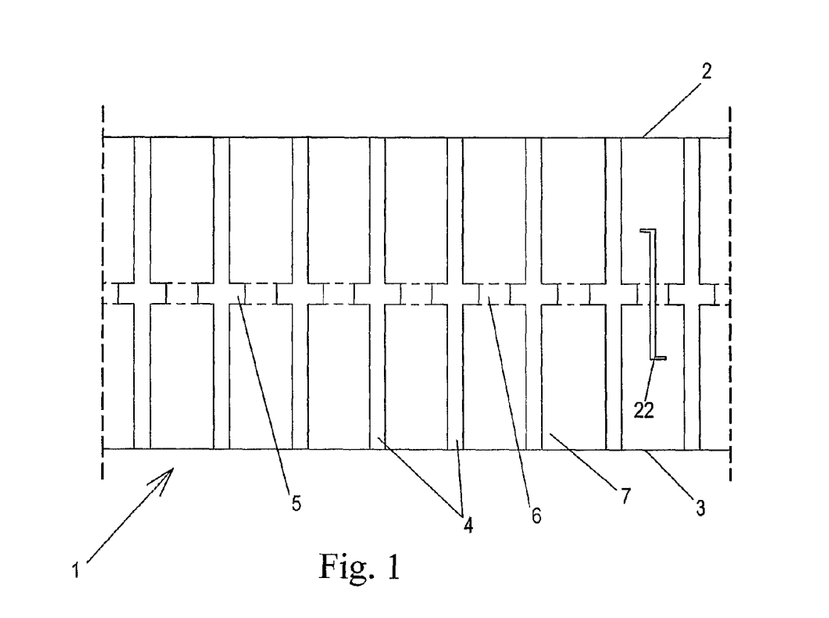
FIG. 1 is a cross section of a preferred embodiment of the translucent building block according to the invention.

FIG. 1 is a cross section of a preferred embodiment of the translucent building block according to the invention. The translucent building block 1 shown has at least two, namely a first and a second bounding or outer surfaces 3. In order to have translucent property the building block 1 has to have at least one, a plurality being shown in the drawing, relatively rigid translucent member 4 having surfaces, preferably but non exclusively, fairly polished, and arranged at least partly between the first and a second bounding surfaces 3, so that the translucent member 4 is surrounded by cast material 7. In this description the term "relatively rigid" means a mechanical property allowing the translucent member to withstand forces acting against the member in the course of the flow of cast material 7 during molding without permanent deformation. In a preferred embodiment not shown in the drawing, the translucent members 4 may protrude beyond the bounding surfaces 2, 3, that is, the translucent members 4 may extend out of the building block 1. In order to fix the translucent members 4 in desired relative positions to each other, the translucent members 4 are arranged in a relatively flat retainer structure 5, which can hold a plurality of translucent members 4 together. The term "relatively flat" means in this description that the retainer structure 5 is preferably sheet like in shape. The retainer structure 5 may be formed as a grid having translucent members 4 arranged in grid points or along grid bars, but it is possible to form it any other adequate way, i.e. as a planar retainer structure 5, or as a retainer structure 5 formed by a sheet having rippled or somewhat wavy surface. It is shown in the drawing, that the retainer structure 5 is shaped preferably as a sheet arranged between the two bounding surfaces 2, 3 in the building block 1. In a particular embodiment, the retainer structure 5 forms one of the two bounding surfaces 2, 3.

Figure 2:
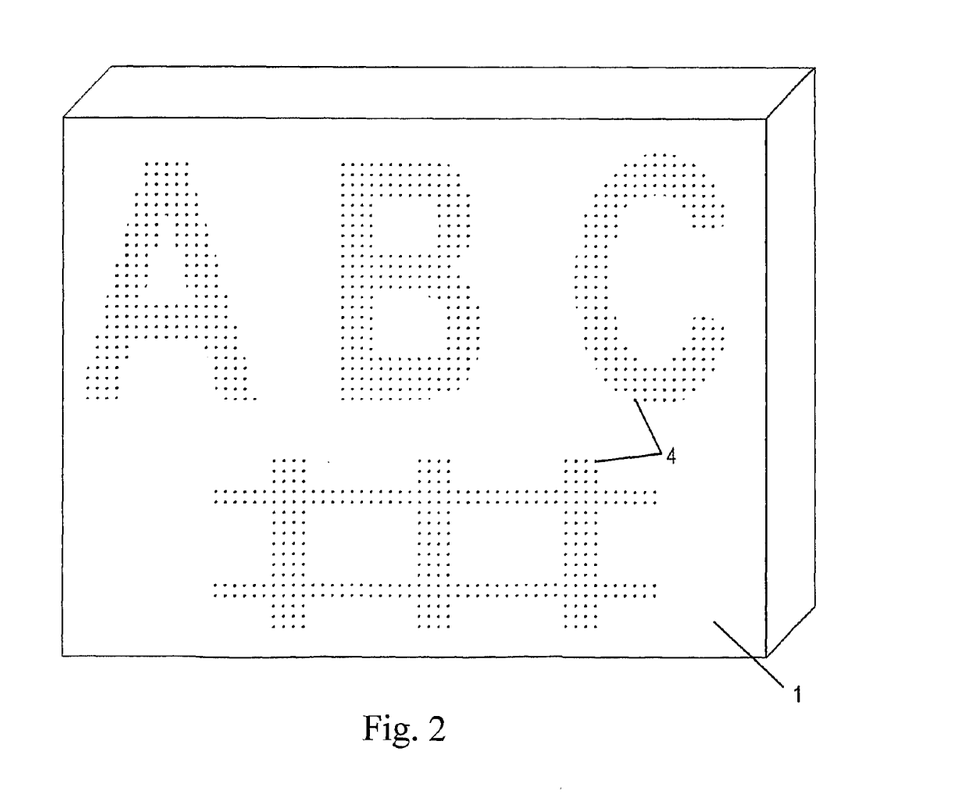
FIG. 2 is a perspective view of a preferred embodiment of the translucent building block according to the invention, with a translucent lettering and illumination design on the surface of the building block.
Figure 2A:
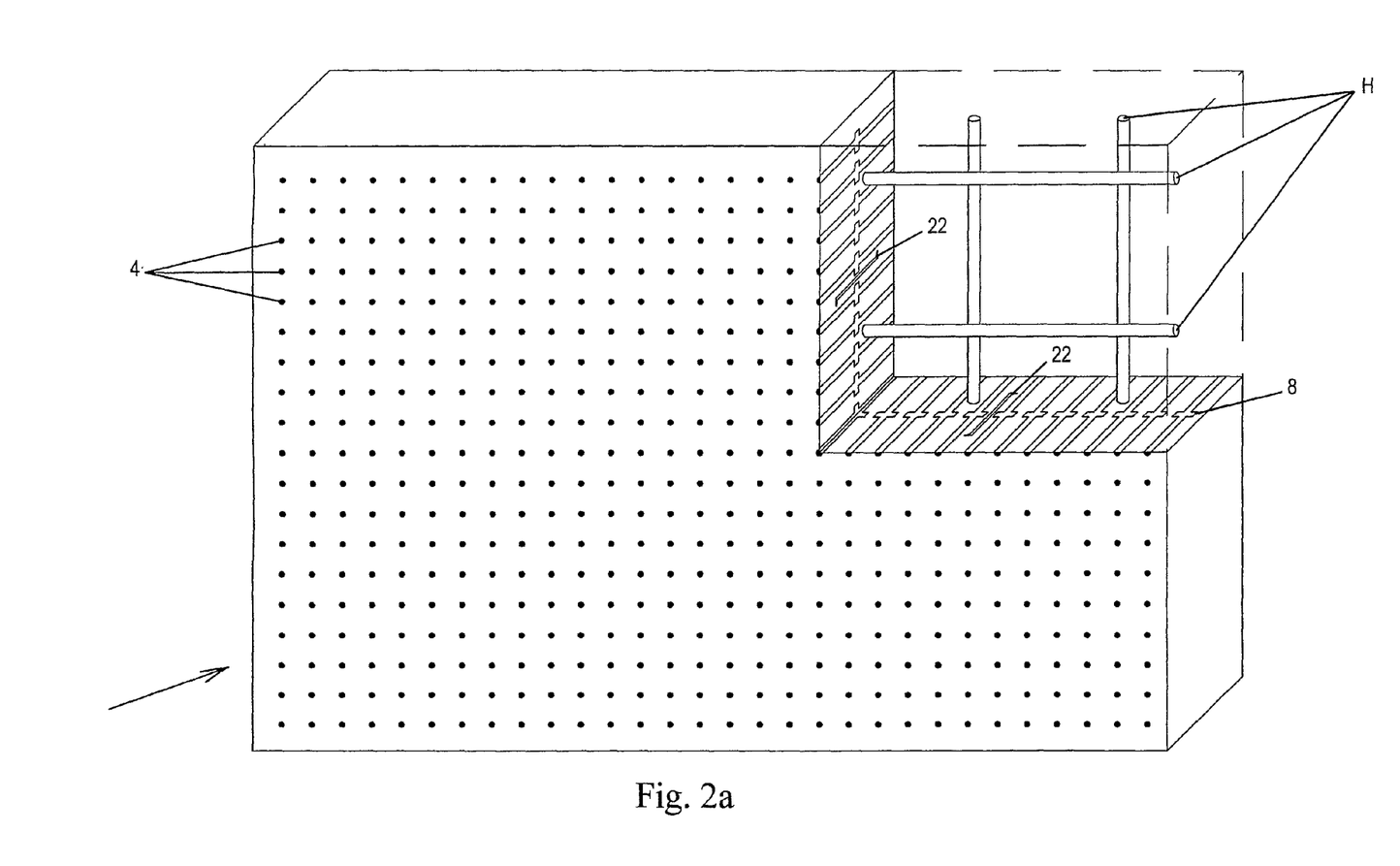
FIG. 2a is a perspective view having portions broken away of a preferred embodiment of the translucent building block according to the invention, with an even distribution of the ends of translucent members on the surface of the building block.

With the embodiment shown in FIG. 1a plurality of translucent members 4 are arranged on the retainer structure 5 so that the translucent members 4 are substantially perpendicular to the retainer structure 5, though the angle between the translucent members 4 and the retainer structure 5 can differ from the right angle, that is, the translucent members 4 may extend at other angels relatively transversely to the retainer structure. Openings 6 are formed in the retainer structure 5 between the translucent members. The openings 6 serve to connect the areas of the cast material 7 forming the building block 1 which are divided by the retainer structure 5 by allowing the cast material to flow through the openings 6 during molding. Reinforcement pieces 22 or bracing or interlocking members, i.e. pins, hooks made if steel or plastic can be arranged in the openings 6 formed on the retainer structure (5) (FIGS. 1 and 2a) or in grid holes (in case of a grid like retainer structure 5 to further reinforce the connection between the parts of the building block 1 divided by the retainer structure. In a further advantageous embodiment (not shown in this Figure) bracing members 19, i.e. pins, hooks made of steel or plastic can be arranged along one or both sides of the retainer structure 5 attached thereto or formed in one piece therewith, in the place of the openings 6 or beside them, depending on mechanical requirements of building block 1 (see FIG. 3a). It is also possible to arrange bracing or interlocking members 20 on the translucent members 4, i.e. rings or the like, or to shape bracing members 20 on the translucent members 4 forming an undercut fixing the translucent member 4 inside the cast material 7. There is a possibility to arrange a linear or bar-mat reinforcement "H" well known in the art of reinforced concrete, along the retainer structure 5 and beside and/or among the translucent members 4 (see FIG. 2a). This reinforcement "H" may be connected to the reinforcement pieces 22 in the openings 6 or to bracing members 19, further enhancing the strength of the building block 1. The translucent members 4 arranged on the retaining structure 5 have, in this embodiment, a shape of a planar figure, i.e. a circle, a triangle or a polygon spaced apart by equal distances. The shape formed by the translucent members 4 may have an irregular shape as well. For example, the translucent members may be arranged on the retainer structure 5 in a shape of a star or other figure or the like. Moreover, translucent members 4 can be spaced apart by arbitrary or unequal distances, by means of which figures or letters may also be formed on the surface of a building block 1. In this case the translucent member 4 have a cross sectional shape of an arbitrarily chosen configuration such as a letter, a number, or a figure, or have similar shapes such that an arrangement of translucent members 4 forms a figure or lettering formed, such as by dots. The translucent member 4 may preferably be made of glass as inorganic material, or of an organic material such as translucent plastic, i.e. PMMA poly(metyl-metacrilate), PC (polycarbonate), or COC (cyclo-olefin copolymer), and the like.

As it has already been noted, the translucent members are held together by a retainer structure 5. Retainer structure 5 and translucent members 4 held thereby together form an insert member 8, which can have varied shapes as above mentioned. Moreover, the same building block 1 might contain one or more insert members 8 depending on a relation between the size of the insert member 8 and that of the building block 1, as well as on the desired size of the translucent surface portion of a surface of the building block 1. A building block 1 may have outer surfaces 2, 3 filled by ends of equally spaced translucent members, but a building block 1 may be formed having outer surfaces with only discrete areas formed by the ends of the translucent members.(see FIG. 2).

Translucent members 4 are surrounded by cast and solidified cast material 7, preferably concrete. It must be noted, however, that the cast material 7 may not exclusively be concrete. As cast material one can use other building materials that pour well and then solidifies, i.e. plaster. These materials, especially the concrete, have excellent heat conductivity characteristics, hence the building block 1 may be provided with a heat insulation material for resisting heat transfer between boundary surfaces 2, 3, but will not form an obstacle to the light guidance of the translucent members 4, and will not decrease the mechanical strength of the building block 1. In a preferred embodiment of the invention, the surface of the retainer structure 5 is covered by heat insulating material. In this case, the retainer structure 5 is covered, such as by an expanded plastic foam sheet as a heat insulating material. In this case, the insulating sheet has openings only at places where the translucent members 4, and reinforcement pieces 22 are present and where the openings 6 are present. In a most preferred embodiment of the invention the retainer structure 5 itself is made of improved heat insulating material. i.e. expanded plastic foam sheet having openings corresponding to the translucent members 4 in place and size, and the translucent members 4 are transversely received in these openings.

Figure 3A:
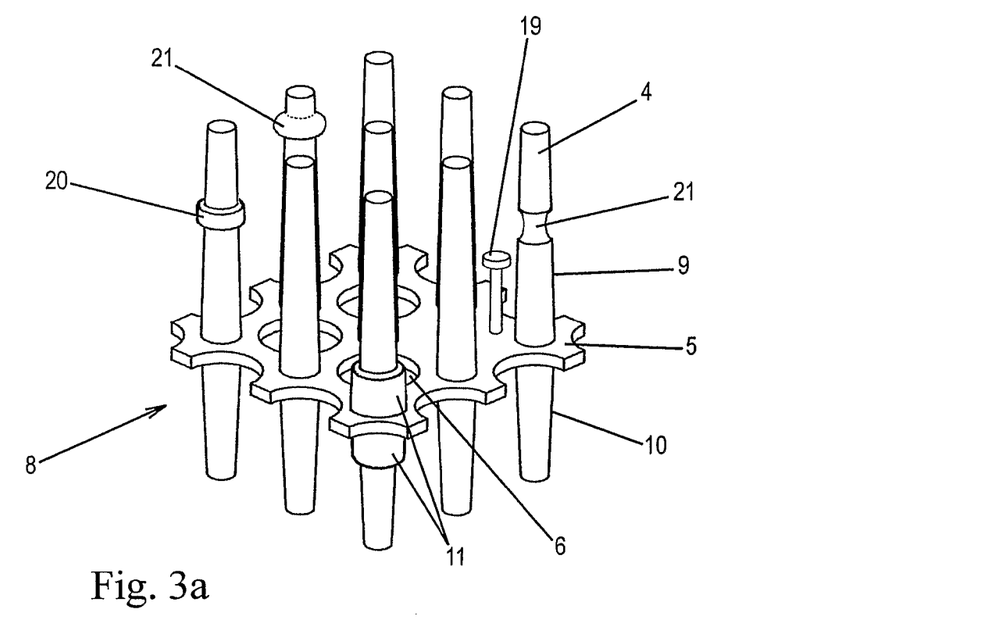
FIGS. 3a and 3b are perspective views of preferred embodiments of the insert member essential to produce the building block according to the present invention.
Figure 3B:
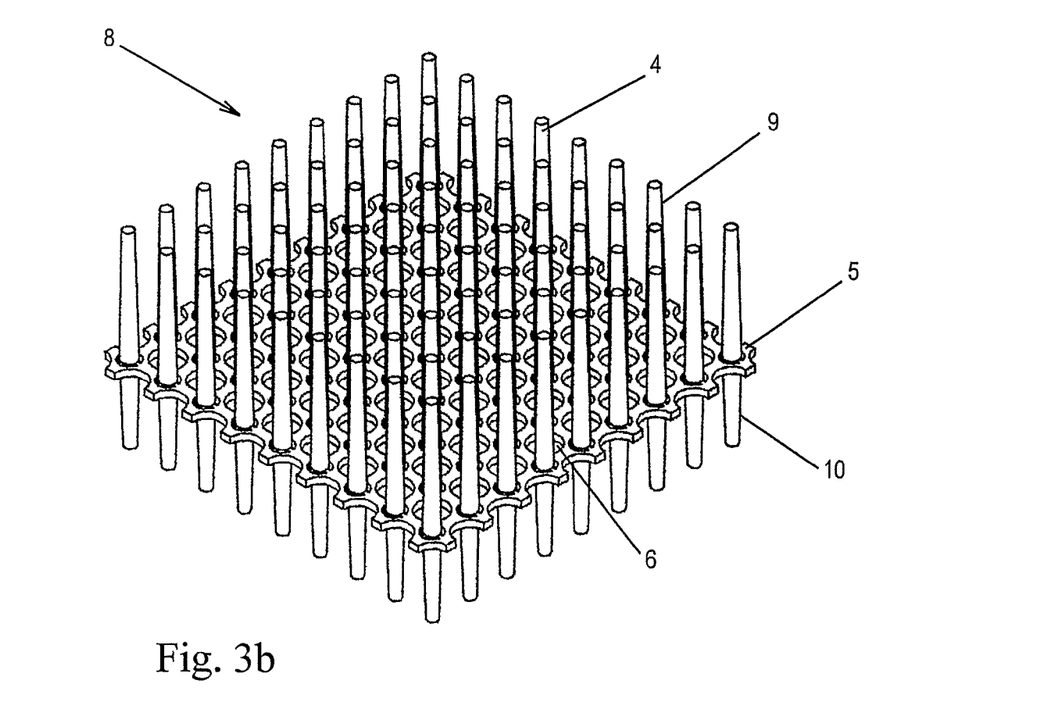

FIGS. 3a and 3b show preferred embodiments of the insert member 8 essential to produce the building block 1 according to the present invention. Insert member 8 shown in FIG. 3a is formed of several translucent members 4 and a retainer structure 5, with the translucent members 4 being arranged spaced apart at equal distances on the retainer structure 5. The translucent members 4 have a first section 9 and a second section 10 protruding from the one side and from the other side of the retainer structure 5, respectively. It can be shown in FIG. 3a that the lengths of sections 9, 10 of the translucent members 4 are not equal in this embodiment, in order to locate the optional reinforcement "H" supported by the retainer structure 5 in the central plane of the building block. Naturally, sections with equal lengths may also be used. In a further embodiment not shown in the drawings, sections 9, 10 of the translucent members 4 may extend at an angle inclined other than 90° to the plane of the retainer structure 5, moreover, they are optionally not parallel to each other. The only requirement in relation to the light guidance is that the ends of the sections 9, 10 reach at least the boundary surfaces 2, 3 during production of the building element 1.

It is further shown in FIG. 3a that the retainer structure 5 has openings 6 formed among the translucent members 4. The openings 6 have a complex function. They serve to allow the cast material to flow through the retainer structure 5 and thereby connect the parts of the building block 1 on either side of the retainer structure 5. Moreover, the openings can receive reinforcement members 22, but not only the elements of a bar-mat structure, but others such as pins, hooks made either of steel or plastic, or equivalent members.

In a further preferred embodiment, as has already been mentioned in relation of the FIG. 1, bracing members 19, i.e. pins, hooks made of steel or plastic can be arranged in the retainer structure 5 attached thereto or formed in one piece therewith, in the place of the openings 6 or beside them (see FIG. 3a). Bracing members 19 may be fixed on the retaining structure 5 such as by means of an adhesive or screw means, etc., well known in itself in the art. Further, it is also possible to arrange bracing members 20 on the translucent members 4, i.e. rings or the like, or to shape bracing members 21 on the translucent members 4 itself.

The translucent members 4 and the retainer structure 5 shown in FIGS. 3a and 3b are made of the same material. This means generally, but not exclusively, that the insert members 8 are preferably formed as a one piece member made of a single material, i.e. PMMA poly(metyl-metacrilate), PC (polycarbonate), or COC (cyclo-olefin copolymer), etc, by way of injection molding. FIG. 3b shows a one piece made insert member 8 containing several translucent members 4.

Figure 4:
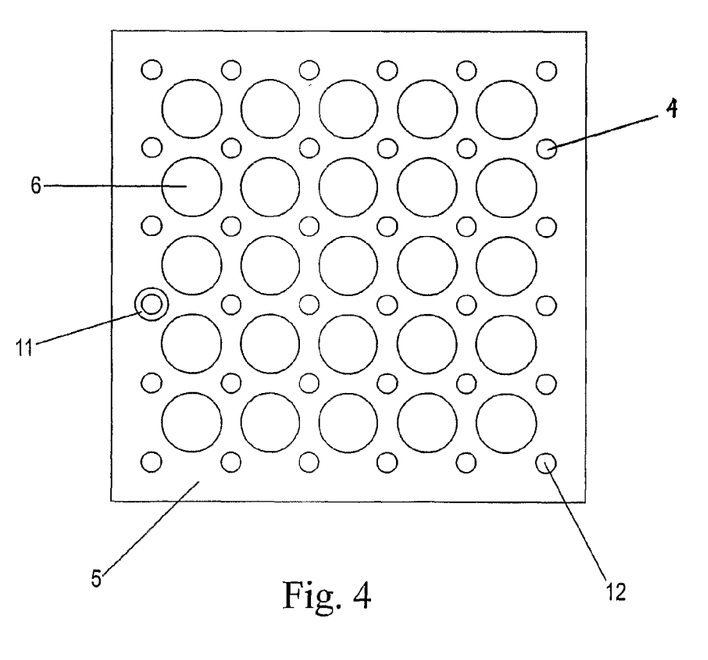
FIG. 4 shows a retainer structure of a preferred embodiment of the insert member according to the invention, with openings and the holes receiving translucent members.
Figure 5:
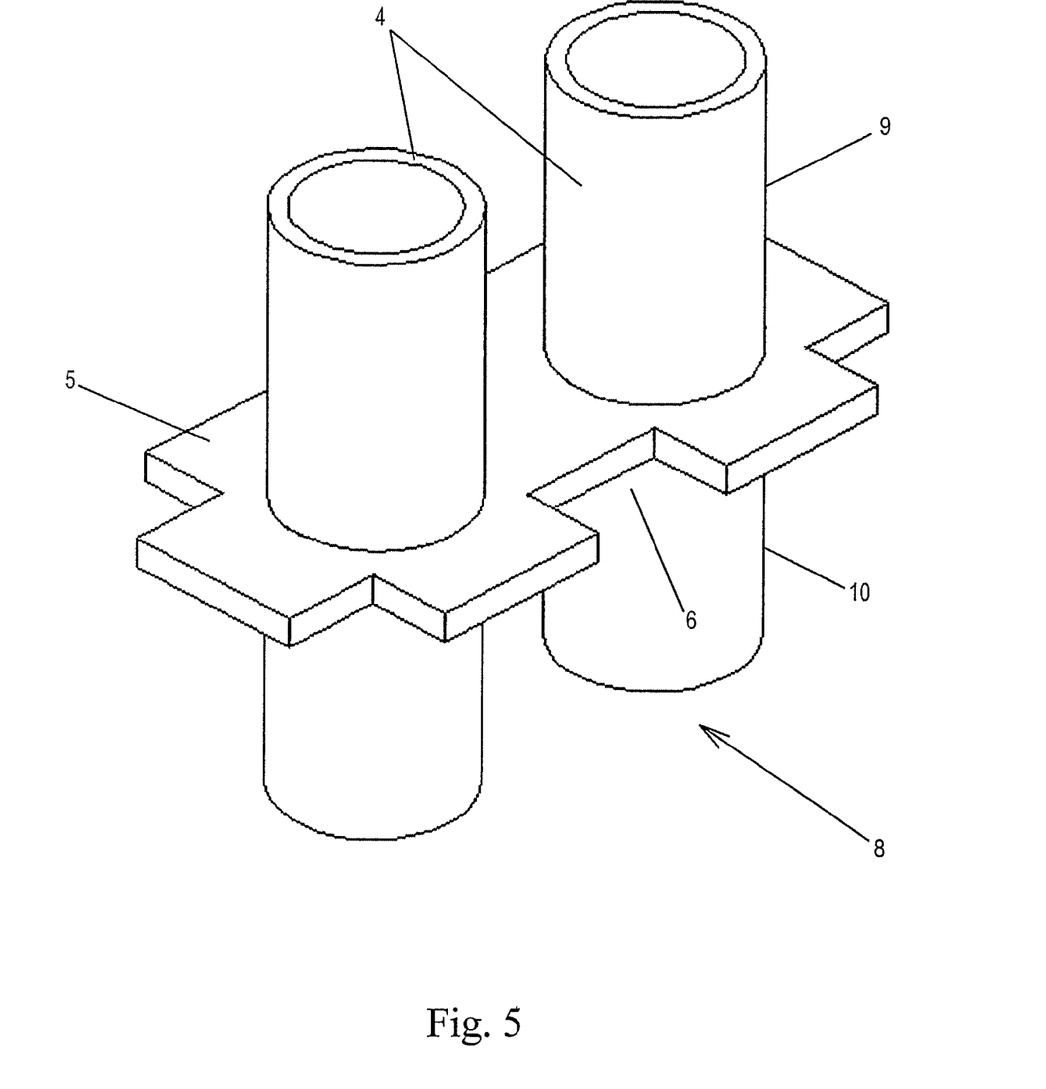
FIG. 5 shows a preferred embodiment of the insert member according to the invention, having translucent members shaped as annular cylinders.

However, particularly with the use of larger translucent members 4, the insert member 8 may be made of a single material, but in the form of an assembled structure, wherein the retainer structure 5 with the openings 6 is made of a plastic by way of injection molding, and short stubs 11 are provided which protrude about the translucent members 4 (see FIG. 3a), into which sections 9, 10 may be injection molded therein or which may be cut from a rod and secured therein by threads or by close friction fit. It is possible to form further openings 12 in the place of the above mentioned short stubs 11, or both but in different locations, which openings 12 are similar to the openings 6 (see FIG. 4). In this embodiment the translucent members 4 having adequate diameter are fitted in the openings 12 by means of close friction or snap fit, or they may be attached or threaded to the stubs 11. In a more preferable embodiment, the function of openings 6 and 12 may be changed. Moreover, the assembled structure embodiment enables the translucent members 4 or their sections 9, 10 to be made of different kind of material having different colors.

As has been described above, both the single piece made and the assembled insert member 8 can be heat insulated. An insert member 8 made of a single piece may receive a heat insulating layer having openings to be aligned with the respective sections 9, 10 of the translucent members 4 and some other openings of which are aligned with the openings 6 of the retainer structure 5. Thus the surface of the retainer structure 5 may be covered by the insulating layer. Also the assembled insert member 8 having openings 12 may be provided with heat insulating structure, but in this case the retainer structure 5 itself may be made of a heat insulating material, such as a polystyrene cell foam. Thus the retainer structure 5 itself consists of a heat insulating layer.

The material of the insert member 8 is an organic material, preferably plastic, in the embodiment shown. However the insert member may be made of inorganic material as glass, nevertheless, in the case of the assembled block, it is possible to make the block of a combination of organic and inorganic materials, i.e. with a retainer structure 5 having openings 6, 12 and made of plastic foam, and with translucent members 4 made of glass or translucent plastic material arranged in the openings 6. The sections 9, 10 of the translucent member 4 are prisms having ends that may be chosen almost arbitrarily, i.e. circle, ellipse, triangle, quadrilateral or a polygon, or a plane figure terminated by several regular or irregular lines.

Thus, in a further embodiment of the insert member 8 according to the invention, the retainer structure has a base plane figure terminated by two regular or irregular lines so as to appear notched on the edges. The translucent members 4 arranged on the retainer structure 5 consist of cylindrical prisms on both sides of the retainer structure 5.

Figure 3C:
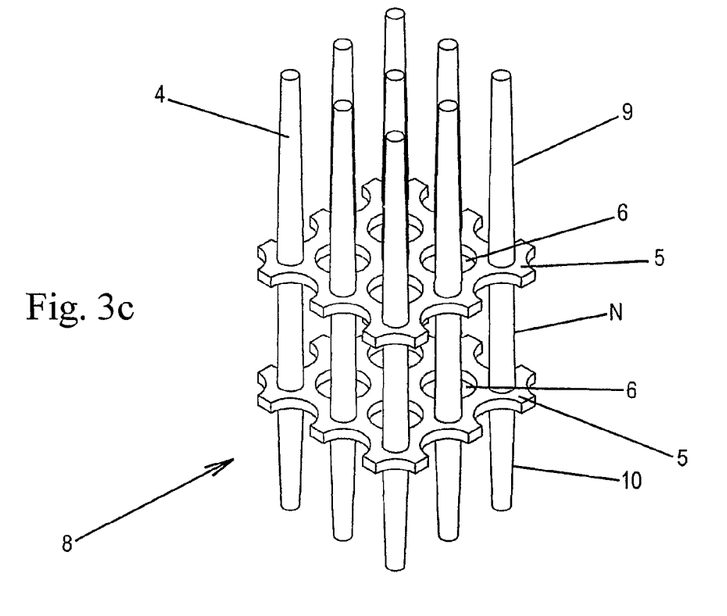
FIG. 3c shows a variant of the insert member according to the invention formed with two retainer structures.

Although with the embodiments shown in the drawings the insert member 8 contains only one retainer structure 5, it is evident that embodiments having more than one parallel or angled retainer structures fall within the scope of the invention. These embodiments may be advantageous in case of long translucent members 4 (for thick building blocks 1). In this case the translucent members 4 have further section(s) "N" arranged between the retainer structures 5 (see FIG. 3c). Therefore, in this description the first and second sections 9, 10 of the translucent members 5 project from a retainer structure 5 of the insert member 8 to a boundary surface of the building block 1. The sections 9, 10, N of each translucent member 4 are continuous so as to function to guide light there through.

As described above, the mechanical strength of the building block 1 can be improved by arranging a linear or bar-mat reinforcement "H" along the retainer structure 5 and beside and/or among the translucent members 4. Reinforcement "H" may be even in contact the retainer structure 5. For preparing and filling the mold cavity 17 the adequate positioning and fixing of the reinforcement "H" may also be provided by the retainer structure 5. The distance between the translucent members 4 are designed so that the reinforcement "H" can be accommodated there between. Reinforcement "H" may be linear or a bar-mat structured. The elements of the reinforcement "H" connecting the two side layers of the cast material can be introduced into the openings formed in the retainer structure 5.

Figure 6:
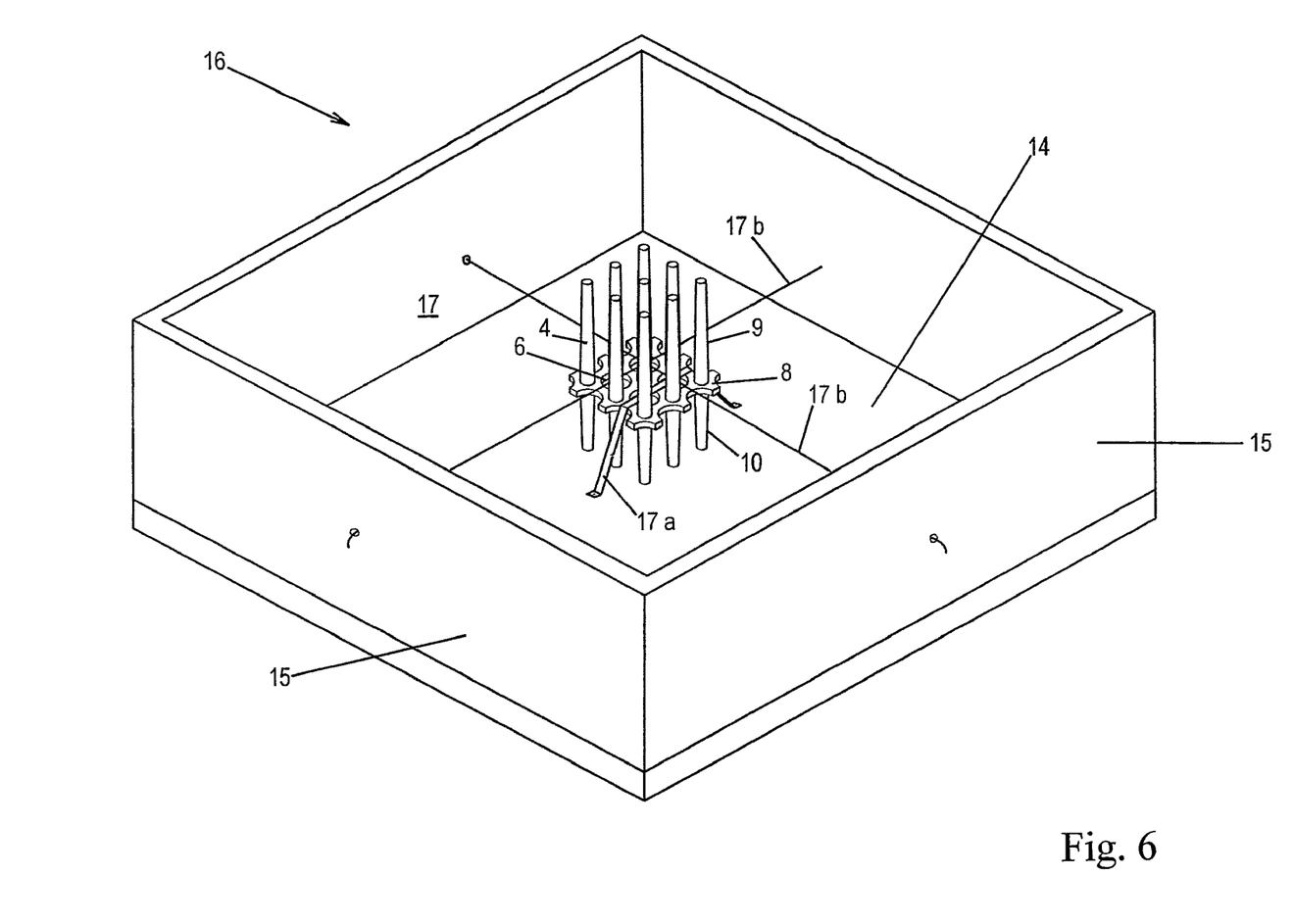
FIG. 6 shows a mold form for practicing the method according to the invention, with an insert member arranged therein.

The building block according to the invention may be produced by a method according to the invention disclosed as follows. The method for manufacturing a translucent building block 1 comprises the steps of arranging one or more insert member(s) 8 as translucent elements including at least one retainer structure 5 and at least one translucent member 4 having at least one section 9, 10, N and protruding at a transverse angle from the retainer structure 5 into the cavity 17 of a mold 16. The mold includes at least a base surface 14 and side walls 15. The ends of these sections 9, 10 of the translucent members make contact with the base surface 14 or sidewalls 15 of the cavity 17, thereby positioning and fixing the insert member(s) 8 in the cavity 7. In the embodiment shown in FIG. 6, that is in the case of a horizontal mold, at least one insert member 8 is seated on the base surface 14, that is, the insert member 8 is supported by the base surface 14. Then, the insert member 8 can be fixed and positioned in the mold cavity 17 of the form 16, such as by means of a strap clamping 17a and/or wire-like fixing means 17b, one end of which may be attached to the insert member 8 and the other one of which is fixed to the side wall 15. The insert member may also be retained using a reinforcement "H" such as a bar-mat reinforcement "H" placed onto the insert member 8. The wire-like fixing means 17b are preferably extended through holes formed in the sidewalls 15 and then fixed outside the mold. The insert member 8 can be positioned and fixed relative to the mold by fitting the ends of the translucent members 4 into holes formed according to the size of the section 9, 10 ends in the base surface 14. After the insert member is fixed within the mold, the mold may be filled with a cast material.

If the cavity 17 is not filled completely by cast material 7 up to the upper ends of the sections 9, 10 farthest the base surface 14, a part of these sections 9, 10 protrudes beyond a boundary or outer surface 2, 3 of the building block 1. In this case, after removing the building block from the cavity 17, the upper boundary surface 2 of the building block 1 may be machined to bring into alignment the ends of the translucent members 4 and the upper boundary surface or wall 2. It is a matter of course that the boundary surface 2 will not be machined for aesthetical reasons, the translucent members 4 will protrude from the building block 1. If holes corresponding to translucent members 4 are formed on the base surface 14, as mentioned above, the translucent members 4 may also protrude from the lower boundary surface 3. Of course, these ends can either be machined off or not.

Base surface 14 can be covered fully or partly by insert members 8. In the latter case one can make a building block having translucent property only in a part of the boundary surfaces 2, 3. The insert members may also be connected to each other.

Figure 7:
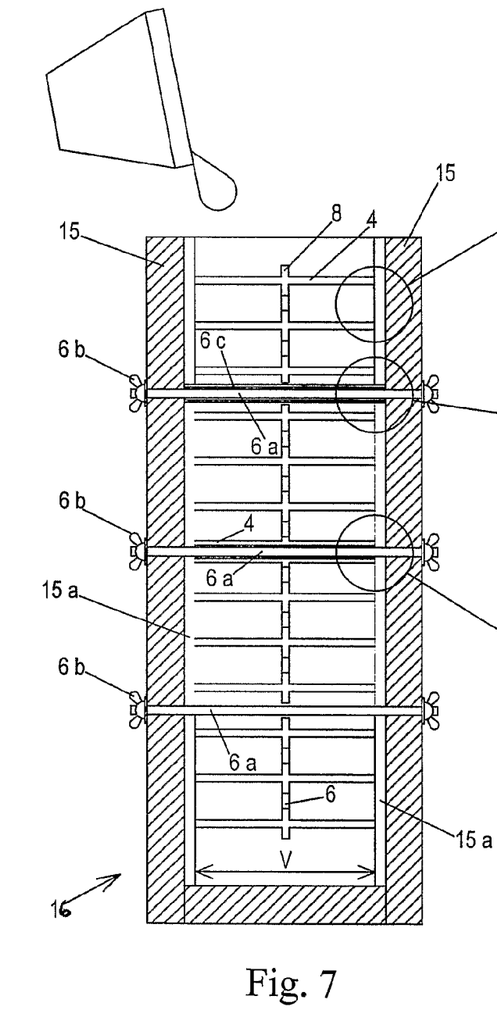
FIG. 7 shows an adjustable mold form for practicing the method according to the invention, with an insert member arranged therein.
Figure 7A:
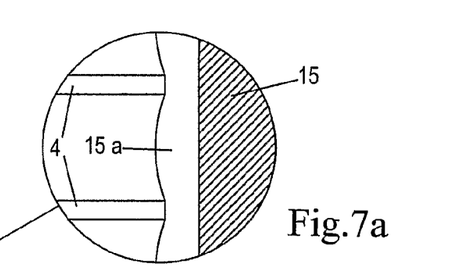
FIG. 7a, 7b, 7c, 7d, are enlarged views of details marked in FIG. 7.
Figure 7B:
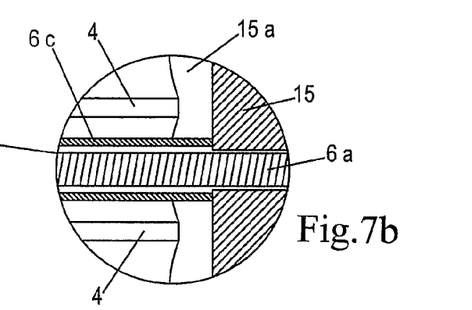
Figure 7C:
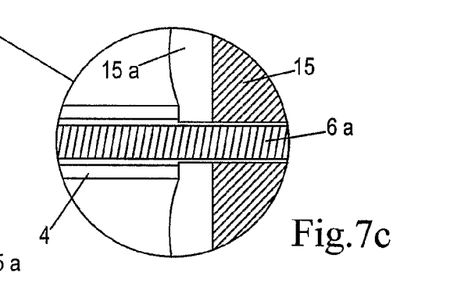
Figure 7D:
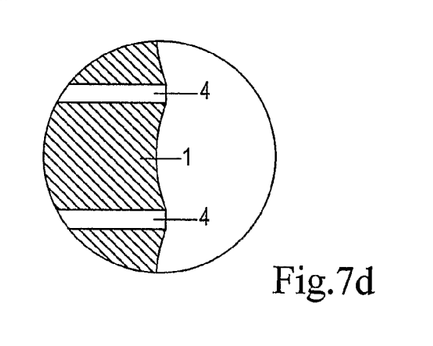

In the case of in situ production or prefabrication of a building block 1 there may be a need to form the block in a vertical mold 16, such as a wall (see FIG. 7). In this embodiment of the method according to the invention the insert member 8 can be supported such as by an other insert member 8. That is, a first insert member 8 will be placed onto the base surface 14 between the side walls of the mold so that the lengths of the translucent members 4 are substantially parallel to the base surface 14 and contacting the respective ends of section 9, 10 to the opposite side walls 15 of the mold. Then imposing the next insert member 8 on the first one so that the insert members 8 contact each other such as by the edges of the retainer structure 5. This way one can vertically fill the cavity 17 of the mold 16. This process may be repeated in order to fill the cavity 17.

In a further preferred embodiment of the method according to the invention in the case of vertical production of the a translucent building block 1, the insert members 8 can be supported by the side walls 15 of the mold 16 rather than being supported by the base surface 14 as above. The insert members may be urged to engage between the opposite side walls 15 or the insert members may be supported in holes formed in the side walls 15 to cooperatively receive the ends of the translucent members 4. Taking into account that the surfaces of particularly very large molds are rarely even and planar, moreover, the gluing and hole making mentioned above would be very time consuming or labor intensive, in a preferred embodiment of the invention at least the surfaces of the at least two opposite side walls 15 are provided with a resilient liner, such as a sheet liner 15a made of a material having adequate elasticity or being able to become locally deformed if exposed to a pressure, and into which the ends of the translucent members 4 may be depressed, as it can be seen in FIGS. 7a, 7b, 7d. The resilient sheet 15a may be made of gum or plastic, but glass fibre fabric sheet 15a is also applicable. FIGS. 7a, 7b, 7c, 7d show enlarged cross sectional views of a building block 1 in the mold 16 taken perpendicularly to the sidewalls 15. The surface of the building block 1 thus achieved may be machined to be flat.

At least two opposite side walls 15 of the mold 16 showed in FIG. 7 can be fixed to each other by means of clamping means, which consists of a bar 6a that is passed through opening 6 and at least one hole formed in the side wall 15 and in the liner 15a. The bar may be a threaded concrete steel bar 6a having nuts adjustably mounted thereto outside the sidewalls 15, that is the side walls may be pre-stressed this way according to the size of the building block to be produced. If the translucent members 4 are used as spacers, they can withstand the necessary pre-stressing force without damage. Thus the bars 6a will remain inside the building block 1 prepared in the mold 16 (FIGS. 7, 7a, 7d), acting as reinforcement pieces 22 shown in FIG. 1. The end portions of the bars 6a protruding beyond the surfaces 2, 3 may be machined off, or they can be used as means for moving the building block 1 and/or for fixing of fittings, etc.

If the translucent members 4 placed into the mold 16 are not able to withstand the pressure forces without damage, a spacer bar 6c or pipe having at least the same length or longer than the total length of the translucent members 4 can be arranged parallel to and around the bars 6a to relieve the translucent members 4. In this case the difference between the total length of the bar 6c and that of the translucent member 4 is between zero and twice the thickness of the liner 15a, and preferably less than the thickness of the liner 15a. In this embodiment the bars 6a or spacers remain inside the building block 1 and act as reinforcement pieces 22 as shown in FIG. 1, though reinforcement pieces 22 are also applicable if necessary. The outer surface of the bars 6c adjoining the material of the building block 1 may be roughened or provided with claws etc. in order facilitate anchoring within the casting material. In the embodiment shown in FIG. 7b the bar 6a can be introduced inside the translucent member 4 and it will be removable after the building block 1 has been finished.

It has been mentioned that the surface of the retainer structure 5 of the insert member 8 might be provided with heat insulating material, before filling the cavity 17 with casting material 7, if necessary. However, the casting material 7 itself may consist of heat insulating material, i.e. concrete mixed with an admixture producing air holes or bubbles, or concrete mixed with polystyrene beads. Before filling the cavity 17, reinforcement pieces 22 or reinforcement elements, such as spacer bars 6c, can be arranged in the openings 6, and a bar-mat reinforcement "H" web known in the concrete art can be placed along the retainer structure 5 and among the translucent members 4, as disclosed above in connection of FIG. 2a. Reinforcement "H" may be connected to the reinforcement pieces 22 or positioned across the openings 6.

After the building block 1 is removed from the mold cavity 17, the surface of the building block 1 can be machined as necessary.

The main advantage of the translucent building block according to the invention against the prior art is that it can be produced easily at a low cost and in arbitrary sizes, even at a building site. There is no need to apply expensive indirect materials which creates extra waste, as well as the fixing of relative position of the translucent members either to each other or to the mold in the case of production of thicker building blocks or applying slimmer and/or less rigid translucent members. Moreover, even translucent or transparent configurations, signs, figures and or even works of art can be provided in solid walls, appearing by means of either natural or artificial light.

The invention claimed is:

1. A building block having translucent properties, comprising;

a first boundary surface and a second oppositely oriented boundary surface spaced from the first boundary surface, a plurality of discrete translucent members extending between the first and second boundary surfaces and being spaced from one another, the translucent members being rods which are generally parallel to one another and having opposite ends that terminate generally at the first and second boundary surfaces when the building block is cast so that the opposite ends are visually apparent when the building block is viewed from outside the block, at least one retainer structure extending in a transverse direction relative to the translucent members and being positioned between the first and second boundary surfaces and the plurality of translucent members being connected so as to extend from opposite sides of the at least one retainer structure so as to thereby form one discrete group of translucent members having open spaces there between, the at least one retainer structure having a plurality of openings there through which are spaced between the plurality of translucent members such that, prior to casting of the building block, open spaces on opposite sides of the at least one retainer structure communicate with one another through said openings, the building block being formed by a self solidifying casting material filling the open spaces between the translucent members and the plurality of openings through the at least one retention structure, the translucent members have sufficient rigidity to preserve their positions under the effect of forces applied by a casting of the cast material , and the plurality of translucent members and the at least one retention structure forming a mechanical structure embedded within the building block.

2. The building block as claimed in claim 1, wherein the at least one retainer structure has a thin sheet-like form.

3. The building block as claimed in claim 1, including at least two retainer structures spaced from one another along a length of the plurality of translucent members and being connected to the plurality of translucent members, whereby the plurality of translucent members having intermediary sections between the at least two retainer structures.

4. The building block as claimed in claim 1, wherein the at least one retainer structure is arranged spaced from a central plane of the building block, and a reinforcement positioned between the first and second boundary surfaces.

5. The building block as claimed in claim 1, wherein reinforcement pieces are positioned in at least some of the plurality of openings in the at least one retention structure to increase a connection of the cast material on the opposite sides of the at least one retainer structure.

6. The building block as claimed in claim 1, including a plurality of discrete groups of translucent members, the groups being positioned with the building block so as to form areas of a predetermined visual pattern to be displayed from the first and second boundary surfaces of the block.

7. The building block as claimed in claim 1, wherein the plurality of translucent members and the at least one retainer structure are integrally molded of a plastic material that permits passage of light there through.

8. The building block as claimed in claim 1, wherein the first and second boundary surfaces are parallel with one another and the opposite ends of the plurality of translucent members are substantially flush with or slightly extending outwardly from the boundary surfaces.

9. A method for manufacturing the building block as claimed in claim 1, comprising the steps of:
- providing a mold having at least two pair of opposing side walls and bottom which together define a mold cavity;
- placing at least one resilient sheet along an interior surface of at least one of the opposing side walls of one of the pair of opposing side walls;
- arranging and positioning the mechanical structure in the mold cavity so that opposite ends of the plurality of translucent members either contact a side wall or the resilient sheet;
- compressing the side walls relative to one another to retain the mechanical structure in a fixed position within the mold cavity;
- filling the mold cavity with casting material, and
- following setting of the casting material, separating the building block from the mold cavity.

10. The method as claimed in claim 9, including placing at least one resilient sheet along an interior surface of each of the opposing side walls of the one of the pair of opposing side walls.

* * * * *